US007054619B2

United States Patent
Kettunen et al.

(10) Patent No.: US 7,054,619 B2
(45) Date of Patent: May 30, 2006

(54) METHOD OF DETERMINING THE VALIDITY OF SERVICE ANNOUNCEMENTS

(75) Inventors: Kimmo Kettunen, Espoo (FI); Timo Alakoski, Helsinki (FI)

(73) Assignee: Nokia Corporation, Espoo (FI)

( * ) Notice: Subject to any disclaimer, the term of this patent is extended or adjusted under 35 U.S.C. 154(b) by 346 days.

(21) Appl. No.: 10/306,162

(22) Filed: Nov. 29, 2002

(65) Prior Publication Data

US 2004/0192267 A1    Sep. 30, 2004

(51) Int. Cl.
    *H04M 3/42*    (2006.01)
(52) U.S. Cl. .................................... 455/414.2
(58) Field of Classification Search ............. 455/414.2, 455/414.3, 414.4
    See application file for complete search history.

(56) References Cited

U.S. PATENT DOCUMENTS 5,353,332 A    10/1994    Raith et al.

6,385,308 B1 *    5/2002    Cohen et al. ............ 379/88.23
6,735,431 B1 *    5/2004    Tsunami et al. .......... 455/414.2
6,798,358 B1 *    9/2004    Joyce et al. ........... 340/995.24

FOREIGN PATENT DOCUMENTS

| EP | 1 006 740 A2 | 6/2000 |
| WO | WO 99/52304 | 10/1999 |
| WO | WO 00/72609 A1 | 11/2000 |

* cited by examiner

*Primary Examiner*—Creighton Smith
(74) *Attorney, Agent, or Firm*—Squire, Sanders & Dempsey LLP

(57) ABSTRACT

Disclosed is a method of determining the validity of service announcements in a cellular mobile network, wherein a multimedia broadcast/multicast service (MBMS) is provided, a service area (SA) is defined by the availability of a specific broadcast/multicast service which availability is announced in each cell, and the method comprises: generating a service announcement area identification (SAA id) which is the same for cells with identical service announcements; and checking by a user entity (UE) upon arrival in a new cell which service announcement is valid by receiving the service announcement area identification (SAA id). Also disclosed are a corresponding system and user entity.

17 Claims, 2 Drawing Sheets

| xxx: | aaa |
| yyy: | aaa ccc |
| zzz: | ccc |
| uuu: | bbb |
| vvv: | aaa bbb |

METHOD OF DETERMINING THE VALIDITY OF SERVICE ANNOUNCEMENTS

BACKGROUND OF THE INVENTION

1. Field of the Invention

The present invention relates to a method of determining the validity of service announcements as well as to a corresponding system and user entity.

2. Related Background Art

The work to standardize a multimedia broadcast/multicast service (MBMS) has been started in the 3$^{rd}$ Generation Partnership Project (3GPP). One of the aims of the work has been to introduce a service provision scheme, which allows multiple subscribers to receive a common transmission through the air interface simultaneously. This transmission may for instance contain video clips from news, sport events, etc.

The multimedia broadcast/multicast services (MBMS) are available within a broadcast/multicast service area (SA), which is defined individually per broadcast/multicast service. That is, a service area is defined as an area where a specific broadcast/multicast service is available, i.e. every area where a specific broadcast/multicast service is available is part of the corresponding service area. Such a service area may comprise one or more local areas which is/are that/those area(s) where the service content is the same. The broadcast/multicast service area may represent the coverage area of an entire Public Land Mobile Network (PLMN), or part(s) of the Public Land Mobile Network's coverage area.

In each cell, service announcements need to be transmitted thus allowing the user to discover the subscribed broadcast/multicast services that are currently active or that will become active at some time later, either at the user's current location or at some other location. These service announcements are identical in those cells where an identical set of services is offered.

However, if a user entity (UE) has to check the service announcement every time it enters a new cell, the battery life of the user entity (UE) may be considerably reduced in relation to such a standard action, since the service announcement can be quite lengthy.

SUMMARY OF THE INVENTION

Therefore, it is an object of the present invention to overcome the shortcomings of the prior art, and to provide a method of determining the validity of service announcements as well as a corresponding system and user entity.

The present invention is a method of determining the validity of service announcements in a cellular mobile network, wherein a multimedia broadcast/multicast service is provided, a service area is defined by the availability of a specific broadcast/multicast service which availability is announced in each cell, and the method comprises: generating a service announcement area identification which is the same for cells with identical service announcements; and checking by a user entity upon arrival in a new cell which service announcement is valid by receiving the service announcement area identification.

In the method according to the present invention, the user entity may receive a service announcement in the new cell if the received service announcement area identification is new to the user entity. On the other hand, the user entity may retrieve the availability of a specific broadcast/multicast service from a memory if the received service announcement area identification is known to the user entity from within an already visited cell. Preferably, the service announcement area identification is included in System Information Block messages which are transmitted in 3$^{rd}$ Generation cells.

As an advantageous modification of the method according to the present invention, there is provided a method of determining the validity of service announcements in a cellular mobile network, wherein a multimedia broadcast/multicast service is provided, a service area is defined by the availability of a specific broadcast/multicast service which availability is announced in each cell, there are service-specific announcements which are the same for the whole service area, and the method comprises: generating a service announcement area identification which is the same for cells with identical service announcements; and checking by a user entity upon arrival in a new cell which service announcement is valid by receiving the service announcement area identification.

This advantageous modification may have the same optional features as described above.

As a further advantageous modification of the method according to the present invention, there is provided a method of determining the validity of service announcements in a cellular mobile network, wherein a multimedia broadcast/multicast service is provided, a service area is defined by the availability of a specific broadcast/multicast service which availability is announced in each cell, a local area is defined as an area where the service content is the same, wherein a service area comprises at least one local area, there are content-specific announcements which are different for different local areas, and the method comprises: generating a service announcement area identification which is the same for cells with identical service announcements; and checking by a user entity upon arrival in a new cell which service announcement is valid by receiving the service announcement area identification.

Again, also this advantageous modification may have the same optional features as described above.

Accordingly, according to the present invention, there is a method where the user entity does not need to check the service announcement every time it enters a new cell. That is, by not checking the service announcement every time a user entity enters a new cell, but just checking the Service Announcement Area identification among the other information broadcasted in the cell, the battery life is extended.

The present invention is also a system for determining the validity of service announcements in a cellular mobile network, wherein the network is adapted to provide a multimedia broadcast/multicast service, and the system comprises: service areas which are defined by the availability of a specific respectively provided broadcast/multicast service; means adapted to announce this availability in each cell; and means adapted to generate a service announcement area identification which is the same for cells with identically provided and announced services.

Preferably, the means adapted to generate the service announcement area identification includes the same in System Information Block messages which are transmitted in 3$^{rd}$ Generation cells.

In the system according to the present invention, the means adapted to announce the availability of a service may be provided for a whole service area. Alternatively, the system may further comprise local areas which are defined as an area where the service content is the same and at least one local area is comprised in a service area, and the means adapted to announce the availability of a service may then be provided different for different local areas.

The present invention is also a user entity for determining the validity of service announcements in a cellular mobile network, comprising means adapted to check, upon arrival in a new cell, which service announcement of a multimedia broadcast/multicast service providing system is valid; and means adapted to receive a service announcement area identification which is the same for cells with identical service announcements.

Optionally, the user entity according to the present invention may further comprise means adapted to receive a service announcement in the new cell if the received service announcement area identification is new to the user entity. In addition, it may further comprise a memory and means adapted to retrieve the availability of a specific broadcast/multicast service from the memory if the received service announcement area identification is known to the user entity from within an already visited cell.

Preferably, the user entity according to the present invention may comprise means adapted to receive the service announcement area identification included in System Information Block messages which are transmitted in $3^{rd}$ Generation cells.

As an advantageous modification, the user entity according to the present invention may comprise means adapted to process service-specific announcements which are the same for a whole service area being defined by the availability of a specific broadcast/multicast service which availability is announced in each cell.

As a further advantageous modification, the user entity according to the present invention may comprise means adapted to process content-specific announcements which are different for different local areas being respectively defined as an area where the service content is the same, wherein a service area comprises at least one local area and the service area is in turn defined by the availability of a specific broadcast/multicast service which availability is announced in each cell.

BRIEF DESCRIPTION OF THE DRAWINGS

Other features, details, and advantages of the present invention will become more fully apparent from the following detailed description of the preferred embodiments of the present invention which is to be taken in conjunction with the accompanying drawings, in which.

DETAILED DESCRIPTION OF THE PREFERRED EMBODIMENTS

According to the present invention, upon arriving to a new cell a user entity (UE) can determine whether the service announcement received previously in some other cell is valid for the new cell. This is effected by broadcasting a Service Announcement Area identification (SAA id) in each cell (e.g. by using System Information Block signaling), which is the same for cells with identical service announcements. Presently considered as preferred embodiments, two different cases are presented depending whether a location specific content of a broadcast/multicast service is taken into account in service announcements or not.

According to the above, the $3^{rd}$ Generation Partnership Project (3GPP) specifies two definitions for broadcast and multicast area: a service area and a local area. The service area is specified as an area in which a specific broadcast/multicast service is available. One service area may consist of one or more local areas. The local area is specified as an area of a service area, where the service content is the same.

As an explanatory example, it might be considered that a multicast service called Traffic News would be present. The multicast service area for the Traffic News shall be Helsinki and Tampere city areas. The multicast service area may have two local multicast areas: one local multicast area for Helsinki and one for Tampere.

According to the present invention, two alternatives for service announcement are considered from these area definitions. That is, there can be service-specific announcements which would be the same for the whole service area, or there can be content-specific announcements which would differ in different local areas, i.e. content-specific announcements have a location specific content.

First Embodiment

According to a first embodiment of the present invention, there are service-specific announcements which are the same for the whole service area. The service area is an area in which a specific broadcast/multicast service is available. Several combinations of example services are transmitted in different cells, i.e. the combination of transmitted example services may differ from cell to cell. Cells with identical service announcements have an identical transmitted service set. Each cell is broadcasting a Service Announcement Area identification (SAA id), which is checked by each user entity (UE) when entering a cell. These identifications are the same for those cells with identical service announcements.

Stated in other words, according to the first embodiment of the present invention, identical service announcements stand for an identical set of transmitted services and comprise the same Service Announcement Area identification (SAA id).

Thus, upon arriving to a new cell, the user entity (UE) can determine whether the service announcement received previously in some other cell is valid for the new cell, just by checking whether the Service Announcement Area identification (SAA id) is different.

Figure 1:
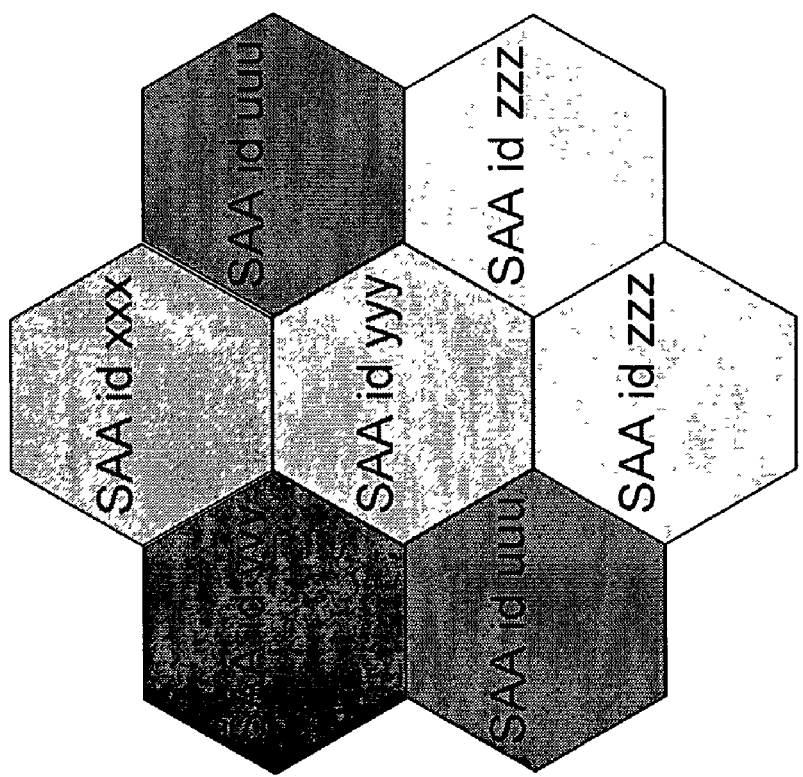
FIG. 1 shows the a first embodiment of the present invention illustrating multimedia broadcast/multicast service-specific announcements.

FIG. 1 shows the case of multimedia broadcast/multicast service-specific announcements (MBMS SA), i.e. the service announcements are broadcast by using the multimedia broadcast/multicast service (MBMS) broadcast mode. Here, in the left column of the table is shown the service announcement content of the different Service Announcement Areas (SAA). Specifically, shown are a multicast service area aaa, a multicast service area bbb, a multicast service area ccc, overlapping areas aaa and ccc, and overlapping areas aaa and bbb. That is, several combinations of example services are transmitted in different cells and cells with the same gray shade have an identical transmitted service set and thus identical service announcements. Each cell is broadcasting a Service Announcement Area identification (SAA id) which is checked by each user entity (UE) when entering a cell. This identifications are the same for those cells with identical service announcements, that is, for cells with the same gray shade in FIG. 1. Thus, upon arriving to a new cell, the user entity (UE) can determine whether the service announcement received previously in some other cell is valid for the new cell just by checking whether the Service Announcement Area identification (SAA id) is different.

Second Embodiment

According to a second embodiment of the present invention, there are content-specific announcements which differ in different local areas. These service announcements contain also details on a location specific content. The method is the same as in the first embodiment, except that in the second embodiment the service announcements are different if there is different location-specific content of the same service transmitted in different cells.

Stated in other words, although the same service is transmitted in different cells, the service announcements differ between the cells if there is different location-specific content.

Figure 2:
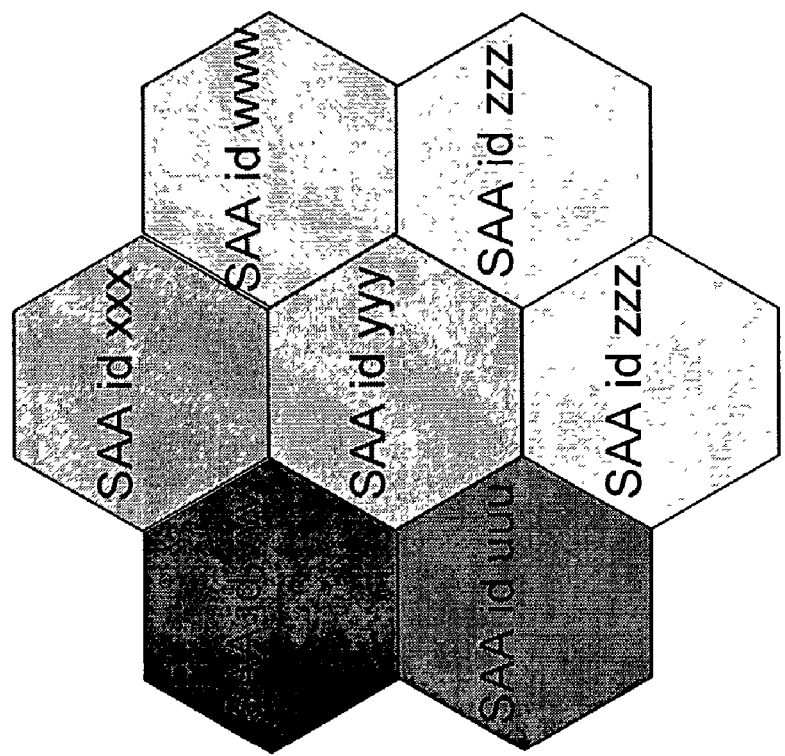
FIG. 2 shows multimedia broadcast/multicast service (MBMS) content-specific announcements, where the service announcements contain also details on location specific content.

FIG. 2 shows the case of multimedia broadcast/multicast service (MBMS) content-specific announcements, where the service announcements contain also details on a location specific content, and the service announcements are again broadcast by using the multimedia broadcast/multicast service (MBMS) broadcast mode. Here, in the left column of the table is shown the service announcement content of the different Service Announcement Areas (SAA). Specifically, shown are a local multicast area aaa, a local multicast area bbb, a local multicast area ccc, a local multicast are ddd, overlapping areas aaa and ccc, and overlapping areas aaa and bbb. As mentioned above, the method is the same as in the first embodiment, except that the service announcements are different if there is a different location-specific content of the same service transmitted in different cells.

As a particularly preferred embodiment for implementing the present invention, it is presently considered to include the Service Announcement Area identification (SAA id) in the System Information Block (SIB) messages transmitted in $3^{rd}$ Generation (3G) cells.

With all embodiments of the present invention, it is possible to achieve the main advantage that the user entity (UE) does not need to check the service announcement every time it enters a new cell.

Thus, what is described above is a method of determining the validity of service announcements in a cellular mobile network, wherein a multimedia broadcast/multicast service MBMS is provided, a service area SA is defined by the availability of a specific broadcast/multicast service which availability is announced in each cell, and the method comprises: generating a service announcement area identification SAA id which is the same for cells with identical service announcements; and checking by a user entity UE upon arrival in a new cell which service announcement is valid by receiving the service announcement area identification SAA id. Also described above are a corresponding system and user entity.

Although it is described above what is presently considered to be the preferred embodiments of the present invention, it is apparent to those with skill in the present art that various changes and modifications may be made without deviating from the spirit and scope of the present invention as defined by the appended claims.

What is claimed is:

1. A method of determining validity of service announcements in a cellular mobile network, wherein a multimedia broadcast/multicast service is provided and a service area is defined by the availability of a specific broadcast/multicast service which availability is announced in each cell, comprising:
generating a service announcement area identification which is the same for cells with identical service announcements; and
checking by a user entity upon arrival in a new cell which service announcement is valid by receiving the service announcement area identification; and wherein
the user entity receives a service announcement in the new cell if the received service announcement area identification is new to the user entity.

2. The method according to claim 1, wherein the service announcement area identification is included in System Information Block messages which are transmitted in $3^{rd}$ Generation cells.

3. A method of determining validity of service announcements in a cellular mobile network, wherein a multimedia broadcast/multicast service is provided, a service area is defined by the availability of a specific broadcast/multicast service which availability is announced in each cell and there are service-specific announcements which are the same for the whole service area, comprising:
generating a service announcement area identification which is the same for cells with identical service announcements; and
checking by a user entity upon arrival in a new cell which service announcement is valid by receiving the service announcement area identification; and wherein
the user entity receives a service announcement in the new cell if the received service announcement area identification is new to the user entity.

4. The method according to claim 3, wherein:
the service announcement area identification is included in System Information Block messages which are transmitted in $3^{rd}$ Generation cells.

5. A method of determining the validity of service announcements in a cellular mobile network, wherein a multimedia broadcast/multicast service is provided, a service area is defined by the availability of a specific broadcast/multicast service which availability is announced in each cell, a local area is defined as an area where the service content is the same, a service area comprises at least one local area, and there are content-specific announcements which are different for different local areas, comprising:
generating a service announcement area identification which is the same for cells with identical service announcements; and
checking by a user entity upon arrival in a new cell which service announcement is valid by receiving the service announcement area identification; and wherein
the user entity receives a service announcement in the new cell if the received service announcement area identification is new to the user entity.

6. The method according to claim 5, wherein:
the service announcement area identification is included in System Information Block messages which are transmitted in $3^{rd}$ Generation cells.

7. A system for determining the validity of service announcements in a cellular mobile network, wherein the network provides a multimedia broadcast/multicast service, comprising:
service areas which are defined by availability of a specific respectively provided broadcast/multicast service;
means adapted to announce the availability in each cell; and means adapted to generate a service announcement area identification which is the same for cells with identically provided and announced services; and wherein the means adapted to generate the service announcement area identification includes identical System Information Block messages which are transmitted in $3^{rd}$ Generation cells.

8. The system according to claim 7, wherein:
the means adapted to announce the availability of a service are provided for a whole service area.

9. The system according to claim 7, wherein:
the system further comprises local areas which are defined as an area where service content is identical and at least one local area is comprised in a service area, and the means adapted to announce the availability of a service are different for different local areas.

10. A user entity for determining the validity of service announcements in a cellular mobile network, comprising:
means adapted to check, upon arrival in a new cell, which service announcement of a multimedia broadcast/multicast service providing system is valid; and
means adapted to receive a service announcement area identification which is identical for cells with identical service announcements and means adapted to receive a service announcement in the new cell if the received service announcement area identification is new to the user entity.

11. The user entity according to claim 10, comprising:
means adapted to receive the service announcement area identification included in System Information Block messages which are transmitted in $3^{rd}$ Generation cells.

12. The user entity according to claim 10, comprising:
means adapted to process service-specific announcements which are identical for a whole service area being defined by the availability of a specific broadcast/multicast service which availability is announced in each cell.

13. The user entity according to claim 10, comprising:
means adapted to process content-specific announcements which are different for different local areas being respectively defined as an area where the service content is identical, wherein a service area comprises at least one local area and the service area is defined by availability of a specific broadcast/multicast service which availability is announced in each cell.

14. A method of determining validity of service announcements in a cellular mobile network, wherein a multimedia broadcast/multicast service is provided and a service area is defined by the availability of a specific broadcast/multicast service which availability is announced in each cell, comprising:
generating a service announcement area identification which is identical for cells with identical service announcements;
checking by a user entity upon arrival in a new cell which service announcement is valid by receiving the service announcement area identification; and wherein
the user entity retrieves the availability of a specific broadcast/multicast service from a memory if the received service announcement area identification is known to the user entity from within an already visited cell.

15. A method of determining validity of service announcements in a cellular mobile network, wherein a multimedia broadcast/multicast service is provided, a service area is defined by the availability of a specific broadcast/multicast service which availability is announced in each cell, and there are service-specific announcements which are identical for the whole service area comprising:
generating a service announcement area identification which is identical for cells with identical service announcements; and
checking by a user entity upon arrival in a new cell which service announcement is valid by receiving the service announcement area identification; and wherein
the user entity retrieves an availability of a specific broadcast/multicast service from a memory if the received service announcement area identification is already known to the user entity from within a previously visited cell.

16. A method of determining the validity of service announcements in a cellular mobile network, wherein a multimedia broadcast/multicast service is provided, a service area is defined by the availability of a specific broadcast/multicast service which availability is announced in each cell, a local area is defined as an area where the service content is identical, wherein a service area comprises at least one local area and there are content-specific announcements which are different for different local areas, comprising:
generating a service announcement area identification which is identical for cells with identical service announcements; and
checking by a user entity upon arrival in a new cell which service announcement is valid by receiving the service announcement area identification; and wherein
the user entity retrieves an availability of a specific broadcast/multicast service from a memory if the received service announcement area identification is already known to the user entity from within a previously visited cell.

17. A user entity for determining the validity of service announcements in a cellular mobile network, comprising
means adapted to check, upon arrival in a new cell, which service announcement of a multimedia broadcast/multicast service providing system is valid;
means adapted to receive a service announcement area identification which is identical for cells with identical service announcements; and
a memory and means adapted to retrieve an availability of a specific broadcast/multicast service from the memory if the received service announcement area identification is known to the user entity from within an already visited cell.

* * * * *